UNITED STATES PATENT OFFICE.

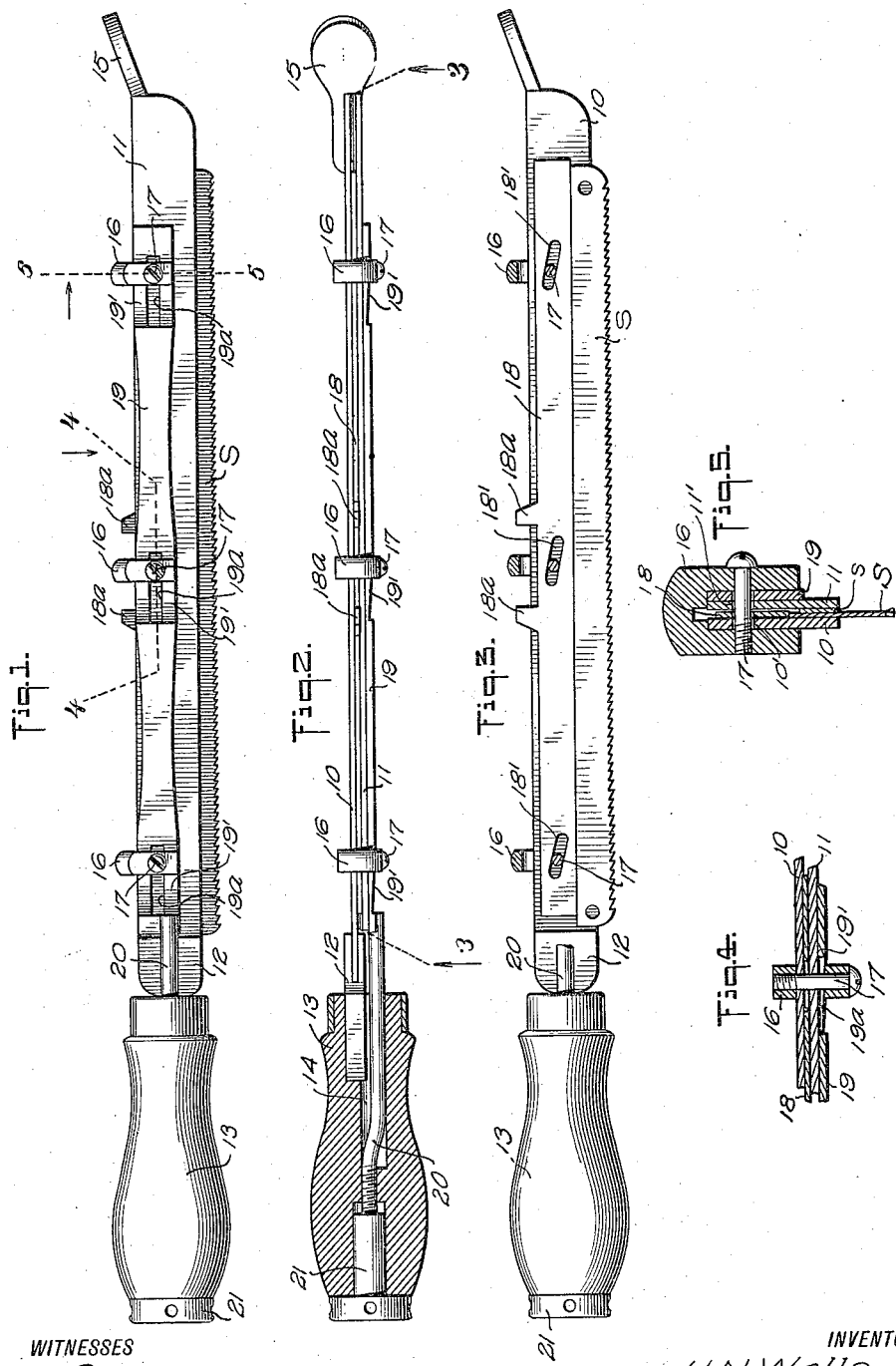

HENRY N. WELLS, OF RIVERHEAD, NEW YORK.

HACKSAW-HOLDER.

1,154,465.  Specification of Letters Patent.  Patented Sept. 21, 1915.

Application filed July 8, 1915. Serial No. 38,632.

*To all whom it may concern:*

Be it known that I, HENRY N. WELLS, a citizen of the United States, and a resident of Riverhead, in the county of Suffolk and State of New York, have invented a new and Improved Hacksaw-Holder, of which the following is a full, clear, and exact description.

This invention relates to hack saws and has particular reference to means for holding hack saw blades or serviceable pieces of hack saw blades for practical operation.

Among the objects of the invention is to provide a holder easy of manipulation for inserting or removing saw blades, but which is adapted for use as the only holder for the hack saw irrespective of the length of the blade.

Another object of the invention is to provide a holding device for hack saws serving as means to gage the depth of cut of the saw, such gage means being accurately adjustable so as to limit the depth of cut in a delicate manner.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a side elevation showing my improvement with a hack saw blade held thereby; Fig. 2 is a plan view of the main portions thereof but with the handle in section; Fig. 3 is a vertical longitudinal section on the line 3—3 of Fig. 2, the handle being in side elevation; Fig. 4 is a longitudinal sectional detail on the line 4—4 of Fig. 1; and Fig. 5 is a transverse sectional detail on the line 5—5 of Fig. 1.

Referring now more particularly to the drawings, it will be noted that the device comprises a holding frame consisting of relatively fixed and movable plates 10 and 11. The fixed plate is connected by a shank 12 to a handle 13 having a longitudinal bore 14 therethrough. The outer end of the main or fixed plate 10 carries a finger piece 15 whereby in connection with the handle the device may be operated by both hands.

At 16 I show a plurality of yokes shown best in Fig. 5 of substantially U-shape and secured permanently and rigidly to the main plate 10 by means of screws, bolts, rivets or the like indicated at 17 as passing through holes 10′ and 11′ of said frame plates and through both legs of the yoke. The two legs of each yoke are sufficiently spaced to allow ample room, not only for the plates 10 and 11, but for the other parts described below.

The hack saw blade S or any useful piece of a hack saw blade is adapted to be held in operative position between the two plates 10 and 11 with the active cutting edge thereof projecting far enough below the edges of the plates for the purpose at hand. In this connection it may be observed that the implement is designed particularly for sawing pipes or other objects to a predetermined depth, such a depth being regulated by the vertical space between the points of the teeth and the lower edges of the plates. The depth of cut of the saw may be determined or regulated by suitable means, such, for instance, as by a gage plate 18 shown in side elevation in Fig. 3 and lying between the upper portions of the plates 10 and 11. The gage plate is provided with a series of slots 18′, one slot for each pin 17. The slots, as indicated, are arranged on an incline with the inclination of the several slots at the same angle and parallel to one another. The gage plate is provided with one or more projections 18ᵃ, whereby when the clamping means is loose, the gage plate may be adjusted longitudinally of the frame with the result that the pins and slots will cause, due to the inclination of the slots, an upward or downward movement of the gage plate sufficient to give a corresponding upward or downward adjustment of the saw. A slight tap by means of a hammer or other tool upon one or the other of the lugs 18ᵃ will serve to adjust the gage plate longitudinally. The adjusting means furthermore provides that the lower edge of the gage plate will always be parallel to the lower edges of the frame plates and hence the depth of cut will be uniform for each adjustment.

The means I provide for clamping the device or tightening the plates, and thereby locking the saw in the desired position, includes a plate 19 having formed thereon a series of wedges 19′ coöperating with the inner walls or faces of the several yoke legs on the same side of the device or next to the movable plate 11. The wedge plate is also provided with slots 19ª, one for each wedge, through which the pins 17 also project. To the inner end of the wedge plate is rigidly secured a shank 20 extending through the bore 14 of the handle and having its free end threaded for engagement with a nut 21 having a hub extending into the bore of the handle and having a head bearing against the end of the handle. Upon rotating the nut 21 in a positive direction by the use of a wrench, spanner, or the like, applied thereto, the shank 20 and the wedge plate 19 will be drawn toward the handle causing the thicker portions of the wedges 19' to bind the plate 11 against the saw or against a shim $s$ which may be employed therein as a filler in case the saw blade is of less thickness than the gage plate, whereby the saw will be locked firmly in position. The same action will serve to lock the gage plate. When it is desired to replace a saw or change its adjustment, the nut 21 is rotated in a reverse direction, permitting the wedge plate to be moved outwardly either by hand or by giving the nut thereon a slight tap, thereby loosening the saw blade and the gage plate. The adjustment then being made, the saw may be again tightened as above described.

I claim:

1. The herein described hack saw holder comprising relatively fixed and stationary parallel plates, a handle secured to the stationary plate, a plurality of yokes embracing said plates and secured rigidly to one of them, said plates being spaced to admit a saw blade between them, means between the plates to determine the depth of cut of the saw, and a wedge plate fitted against one of the frame plates and within the yokes serving to clamp the frame plates and saw between them in firm position.

2. In a hack saw holder, the combination of a pair of spaced parallel plates, a handle secured to one of the plates, a plurality of U-shaped yokes extending over the two plates and bearing against the outer faces thereof, means locking the yokes to one of the plates, a gage plate between the two frame plates and having its lower edge parallel to the lower edges of the frame plates, a binding member between one leg of each yoke and the adjacent frame plate, and means acting through the handle serving to cause said binding member to lock the saw in position with its upper edge against said gage plate.

3. In a hack saw holder, the combination of a pair of spaced parallel frame plates, a plurality of U-shaped yokes embracing said plates, fixed pins rigidly securing the yokes to one of the plates, a handle secured to the last mentioned plate and having a bore extending therethrough, the space between the plates being adapted to receive a saw blade, a wedge plate lying between the movable frame plate and the free legs of the yokes, said wedge plate having a series of wedges coöperating with the yokes, and means extending between the handle bore serving to cause the wedge plate to bind the saw in firm position between the main frame plates.

HENRY N. WELLS.

Witnesses:
GEORGE W. HILDRETH,
CLINTON T. VOORHEES.

Copies of this patent may be obtained for five cents each, by addressing the "Commissioner of Patents, Washington, D. C."